Patented Aug. 21, 1923.

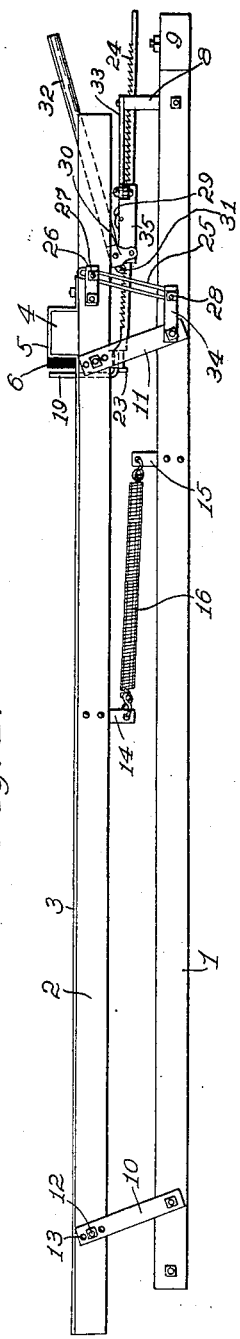

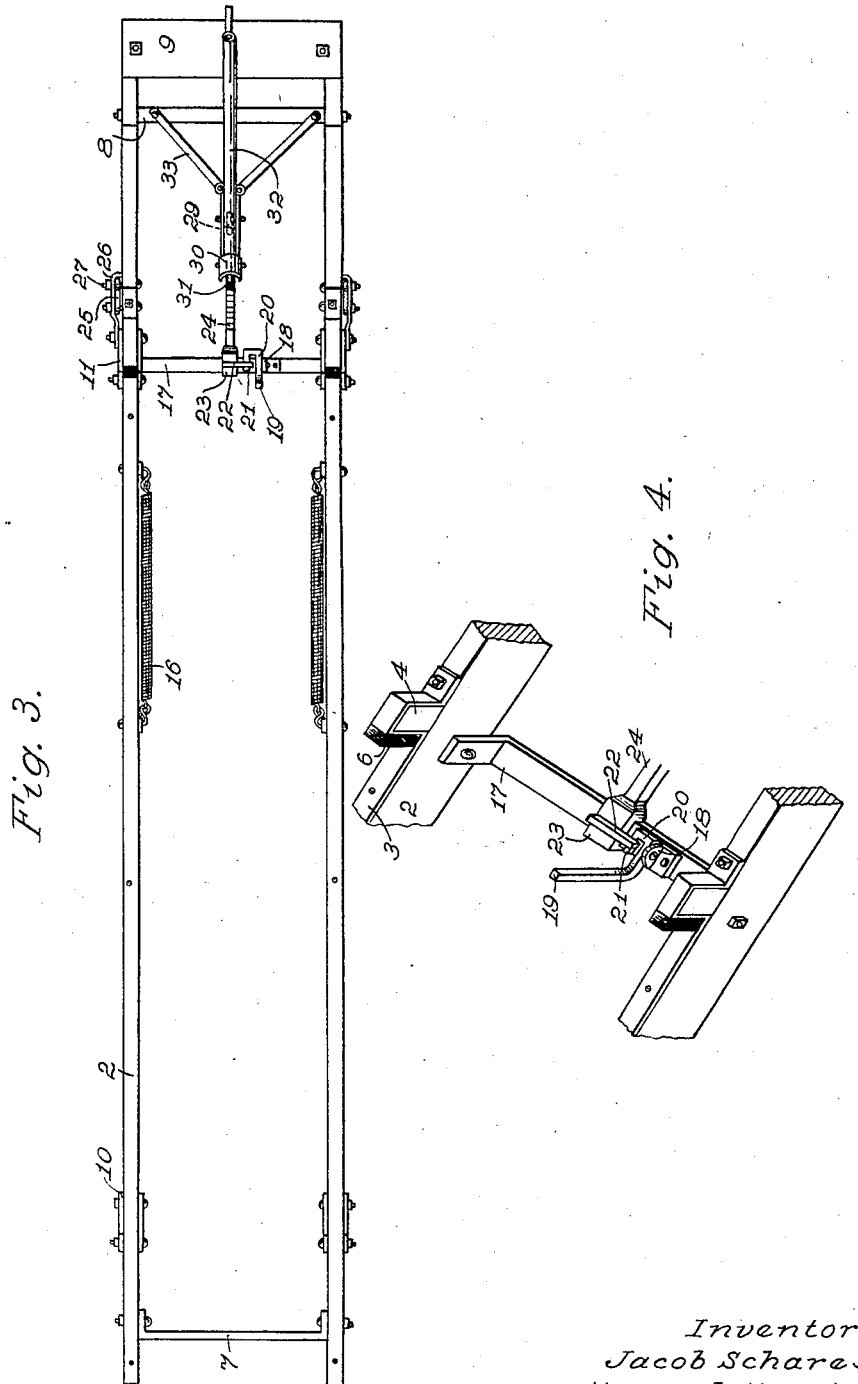

1,465,739

UNITED STATES PATENT OFFICE.

JACOB SCHARES, OF GILBERTVILLE, AND HENRY J. KAUTH, OF WASHBURN, IOWA.

AUTOMOBILE LIFTING DEVICE.

Application filed March 16, 1922. Serial No. 544,249.

*To all whom it may concern:*

Be it known that we, JACOB SCHARES and HENRY J. KAUTH, citizens of the United States of America, and residents of Gilbertville, Blackhawk County, Iowa, and Washburn, Blackhawk County, Iowa, respectively, have invented certain new and useful Improvements in Automobile Lifting Devices, of which the following is a specification.

This invention relates to improvements in automobile lifting devices and the particular object of this invention is to provide means operable by such a vehicle while in motion to utilize the momentum of the vehicle in lifting and supporting it in a position where its pneumatic tires are specially elevated above the supporting surface.

Another object of our improvements is to supply mechanism operable to releasably return the lifting device to its initial state while lowering the vehicle to the supporting surface.

These objects have been accomplished by the means which are hereinafter described and claimed, and which are illustrated in the accompanying drawings, in which Figs. 1 and 2 are side elevations of our improved automobile lifting device showing it respectively in its lowered and in its raised positions, the dotted lines in Fig. 2 indicating the position of a motor vehicle as lifted and supported by said device. Fig. 3 is a top plan of the device as in its lowered position, and Fig. 4 is a fragmentary perspective view of the tripping device for the lowering mechanism.

Our improved lifting device comprises a basal stationary frame 1 and a longitudinally movable frame 2 positioned thereabove. The lower frame 1 consists of spaced parallel beams whose rear ends are rigidly connected by means of the cross-bar 7 and whose forward ends are connected rigidly by means of an arch-bar 8, said frame resting upon the horizontal supporting surface preferably, with the forward ends of the beams 2 in contact with a fixed cross-beam 9 secured to the supporting surface.

The movable frame consists of spaced parallel beams 2 which are connected near their forward and rear ends to the frame 1 by pairs of links 11 and 10 respectively so that the frame 2 may swing longitudinally only with its side bars or beams immediately above the side bars or beams 1 below.

For purposes of vertical adjustments of the movable frame vertically from the fixed frame 1. the upper end parts of said links are provided with a number of bolt-holes 13 to interchangeably receive the pivot-bolts 12, and this permits of positioning the movable frame at different altitudes to properly coact with front axles of different heights of vehicles. Near the front ends of the two frames 1 and 2 and beyond the forward pairs of links 11 are other linking connections 25 consisting of elongated loops whose ends receive the pivot-bolts 27 and 28, the ends of the loops being mounted between said frames and spaced stop-bars 26 and 34 secured thereon.

As shown in Fig. 2, the loops 25 are not parallel with the links 11 and serve to limit the longitudinal movement of the frame 2 forwardly.

At each side of the frames and positioned longitudinally relative to the space therebetween is a coiled tension spring 16 whose forward and rear ends are respectively connected to fixed projections 15 and 14 on said frames 1 and 2, and these springs serve to yieldingly elastically shift the frame 2 forwardly to its most elevated position.

Positioned between the upper ends of the links 25 and 11, stop-blocks 4 are secured on the tops of the side-beams 2 opposite each other. The numeral 3 denotes a wearplate secured upon the upper surface of each side-beam 2 and has a part bent in strapform at 5 over and around the block 4 to reinforce the latter, and preferably an elastic body or buffer 6 of india rubber or other material is fastened upon the rear vertical face of the strap 5 to receive the impact of the front axle of the vehicle in the operation of the device.

As indicated in said Fig. 2, the mechanism heretofore described suffices to lift and support a vehicle 36, whose carrying-wheels 38 ride astride said frames to cause its front axle 37 to bump against the bumper 6 and block 4 on each side. The momentum of the vehicle causes the axle to push the movable frame 2 forwardly to about the positions shown in Fig. 2, where the links 10 and 11 are slightly inclined forwardly, and the links 25 are swung forwardly to the limit, and as the upper pivots of the links 10 and 11 have passed their dead center, the frame 2 is supported rigidly in its elevated position with the pneumatic tires of the wheel 38 raised above the supporting surface.

In order to conveniently and easily manually return said frame 2 and its load to a lowered position, we have provided the following releasable ratchet mechanism connected between said frames at their forward ends. The numeral 24 denotes a ratchet-bar positioned longitudinally and medially between the forward parts of said frame, and mounted to slide back and forth in a tubular housing 35, the latter having at its forward end divergent bracketing bars 33 whose forward extremities are fastened upon the top horizontal member of the arch-bar 8. The rear end of said ratchet-bar has the shape of a hook 23 adapted to overlie and engage a depending arch-bar 17 which is fixedly connected across the frame 2. A locking-pawl 29 is mounted medially in the housing 35 to engage teeth of the ratchet-bar 24. A loop-member 30 is pivotally mounted on the rear end of the housing 35 and the rear end of the hand-lever 32 is pivotally connected to said loop and carries a terminal driving-pawl 31 also adapted to engage the teeth of the ratchet-bar. The numeral 22 denotes a projection extending rigidly from the top of the hook 23 to one side. A lug 18 is secured upon the cross-bar 17 near the end of the projection 22 but spaced therefrom, and a rock-bar 20 is pivotally mounted on said lug to rock back and forth. The rear part of the rock-bar 20 is bent upwardly to provide a trigger 19 which is slightly to the rear of the bar 17 and of the buffers 6—4, as shown in Fig. 1. The forward end of the rock-bar 20 is formed with an offset and rearwardly directed finger 21 positioned between the projection 22 and bar 17. When the frame 2 is in its lowered position, the hook 23 should be engaged with the bar 17 so that the ratchet-mechanism and said tripping-device are positioned and arranged as shown in Figs. 3 and 4. When the vehicle 36 has moved astride said frames to the position shown in Fig. 2, its forward axle engages and rocks forwardly the trigger 19 just before engaging the buffers 6—4. This causes the finger 21 to thrust upwardly on the projection 22 and disengage the hook 23 from the bar 17 simultaneously with the engagement of the axle 37 with the said buffers. The upper frame 2 is thus permitted to swing forwardly to its locked position while lifting the vehicle from the supporting surface.

To return the frame 2 to its initial position while lowering the vehicle, the hand lever 32 is manually employed with its pawl 31 upon said ratchet-bar 24 to propel the frame rearwardly, it being understood that before this is done, the ratchet-bar should be longitudinally adjusted to engage its hook 23 again with the cross-bar 17.

Having described our invention, what we claim as new and desire to secure by Letters Patent, is:

A device of the character described, comprising a stationary frame, a movable frame thereabove, pivoted linking-connections between said frames, longitudinally positioned elastic connections between said frames, means for limiting the scope of longitudinal movement of the movable frame in one direction, raised stops on one end part of the movable frame, releasable adjustable connecting mechanism between said frames operable when connected to both to propel the movable frame in one longitudinal direction, a ratchet-mechanism releasably connected between said stationary and movable frames operable to return the movable frame to an initial position after the latter has been moved to a limit in an opposite direction, and a tripping device arranged near said stops to be actuated by an approaching vehicle to release the ratchet-mechanism when the vehicle engages said stops.

Signed at Waterloo, Iowa, this 13th day of Feb., 1922.

JACOB SCHARES.
HENRY J. KAUTH.